United States Patent
Zhang et al.

(10) Patent No.: US 7,385,920 B2
(45) Date of Patent: Jun. 10, 2008

(54) FLOW ADMISSION CONTROL FOR WIRELESS SYSTEMS

(75) Inventors: Danlu Zhang, San Diego, CA (US); Rajesh K. Pankaj, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 787 days.

(21) Appl. No.: 10/749,534

(22) Filed: Dec. 30, 2003

(65) Prior Publication Data
US 2005/0059417 A1   Mar. 17, 2005

Related U.S. Application Data

(60) Provisional application No. 60/503,193, filed on Sep. 15, 2003, provisional application No. 60/503,192, filed on Sep. 15, 2003.

(51) Int. Cl.
*G01R 31/08* (2006.01)
(52) U.S. Cl. ..................... 370/229; 370/232
(58) Field of Classification Search .......... 370/329, 370/229, 232; 455/453
See application file for complete search history.

(56) References Cited

U.S. PATENT DOCUMENTS

| 7,006,466 | B2 * | 2/2006 | Borst et al. ............ 370/329 |
| 2002/0110106 | A1 | 8/2002 | Koo et al. |
| 2002/0161914 | A1 | 10/2002 | Belenki |
| 2003/0128664 | A1 * | 7/2003 | Connor ............... 370/229 |
| 2003/0199278 | A1 * | 10/2003 | Lee et al. ............ 455/452.2 |

FOREIGN PATENT DOCUMENTS

| EP | 1 227 695 A1 | 7/2002 |
| EP | 1 318 689 A2 | 6/2003 |
| WO | WO 02/067619 A2 | 8/2002 |

OTHER PUBLICATIONS

International Search Report ISA EPO PCT/US2004/029525 Apr. 5, 2005.

* cited by examiner

*Primary Examiner*—Matthew Anderson
*Assistant Examiner*—Angelica M. Perez
(74) *Attorney, Agent, or Firm*—Thomas R. Rouse; Charles D. Brown; Jian Ma

(57) ABSTRACT

An apparatus for a wireless communication system that includes means for determining available resources in the wireless communication system and means for determining an admission of a flow.

21 Claims, 5 Drawing Sheets

FLOW ADMISSION CONTROL FOR WIRELESS SYSTEMS

CLAIM OF PRIORITY UNDER 35 U.S.C. §119

The present Application for Patent claims priority to U.S. Provisional Application No. 60/503,193 entitled "FLOW ADMISSION CONTROL FOR WIRELESS SYSTEMS" filed Sep. 15, 2003, and U.S. Provisional Application No. 60/503,192 entitled "QUALITY OF SERVICE SCHEDULING METHODOLOGY" filed Sep. 15, 2003, both assigned to the assignee hereof and hereby expressly incorporated by reference herein.

BACKGROUND

1. Field

The present invention relates generally to wireless communication, and more specifically to control of wireless communication services.

2. Background

Allocating resources is necessary for a wireless communication system since resources available to that system can be limited for a varying number of subscribers. The purpose of controlling an admission of communication channels, i.e. flows, into the wireless communication system, is to provide a level of quality to each of the subscribers already in the system, i.e. a Quality of Service (QoS). One approach can be to limit the total amount of traffic to an appropriate level for these resources. For a system providing a variety of differentiated services, an assignment of a priority to each of the multiple communication flows can balance the conflicting objectives of high utilization of sector capacity, with the satisfaction of priority requirements. Further, due to the time varying nature of a wireless channel, some headroom in resource utilization must be left to ensure that the priority requirements are satisfied continuously throughout the entire session, even during short periods of deep fading.

Based on simulation, it has been determined that channel fading is the dominant reason for packet drops. Most of the packet drops happen when the user is in deep fading. With present systems, there is no knowledge of user mobility patterns; namely, characteristics of such long term fading are unknown. A simple way of admission control could be based on the total demand and fixed capacity obtained through averaging over all the conceived scenarios including number of flows from each QoS class, user location, mobility pattern, and so forth. After the capacity is obtained, the implemented algorithm would be purely based on the total request. Despite this simplicity, this scheme suffers from the shortcoming that the capacity number will be highly dependent on the coverage condition in the sector and it will change as new base stations are set up.

SUMMARY

In a High Data Rate (HDR) system, admission control algorithms can limit the amount of traffic in a sector so that priority requirements can be satisfied in the presence of wireless channel conditions that vary over time. To enable admission control algorithms and parameters to be more generally applicable and robust against changes in network deployment, the present invention bases the admission control on real time system utilization. This approach requires statistics collection and processing.

In one embodiment, an admission control can be based on time slot utilization from flows and on a satisfaction of conditions determined by their priorities in terms of delay and throughput. Time slot utilization and priority violations can be monitored in real time for existing flows. A new flow may be admitted only if the total time slot utilization is below a certain threshold. The status of existing flows can be adjusted if requirements relating to their priority cannot be satisfied or they occupy excessive resources due to extended periods of deep fading. This adjustment can include termination of a delay sensitive flow and degradation of a rate sensitive flow to abest effort status.

DETAILED DESCRIPTION

A control of the admission of users into a wireless communication system, where a communication channel of each user, i.e. a flow, may have one of a variety of different priorities, is disclosed. An element of the wireless communication system, such as, for example, a Base Transceiver Station (BTS or base station), can contain admission control functions. These functions, existing as admission control apparatus and methods, can represent a structured access to the communication system. Such access can be for a number of remote devices where the access can be determined by a priority approach. There may exist a number of service requirements where each requirement can represent a different priority, each priority assigned to a rate or minimum rate that is available to the communication flow. As examples, service assignments can include a high priority service such as Expedited Forwarding (EF) for delay and jitter sensitive (variance of delay per packet after packet) flows or a medium priority service such as Assured Forwarding (AF) with a guaranteed minimum rate. An additional priority service can be Best Effort (BE) which might not have a guaranteed rate but could offer a rate based on whatever capacity was remaining. In addition, such an admission control can include monitoring the overall existing flows within the control of the BTS and adjusting individual flows, such as by terminating or degrading the service, if certain conditions are met.

In one embodiment within one or more BTS of the wireless communication system, the task of admission control can exist at a processor. A packet scheduler can connect to all channel elements within the BTS and as such, be well positioned to manage QoS, i.e. priority, requirements. Once a flow is admitted by the admission control, the packet scheduler within the BTS can manage the various service assignments of the flows and where the packet scheduler can exist, for example, at a Data Signal Processor (DSP).

DSPs can be special microprocessors designed to execute repetitive math-intensive algorithms. DSPs can have approximately the same level of integration, the same clock frequencies as general purpose microprocessors. DSPs can overtake general purpose processors by 2 to 3 orders in speed because of architectural differences. Typical DSP application fields can be audio signal processing, video signal processing and telecommunications devices where such digital signal processing requires a large amount of real-time calculations. The most common operation in digital signal processing is the sum of products calculation. Among such operations are well known convolution and Discrete Fourier Transform.

Figure 1:
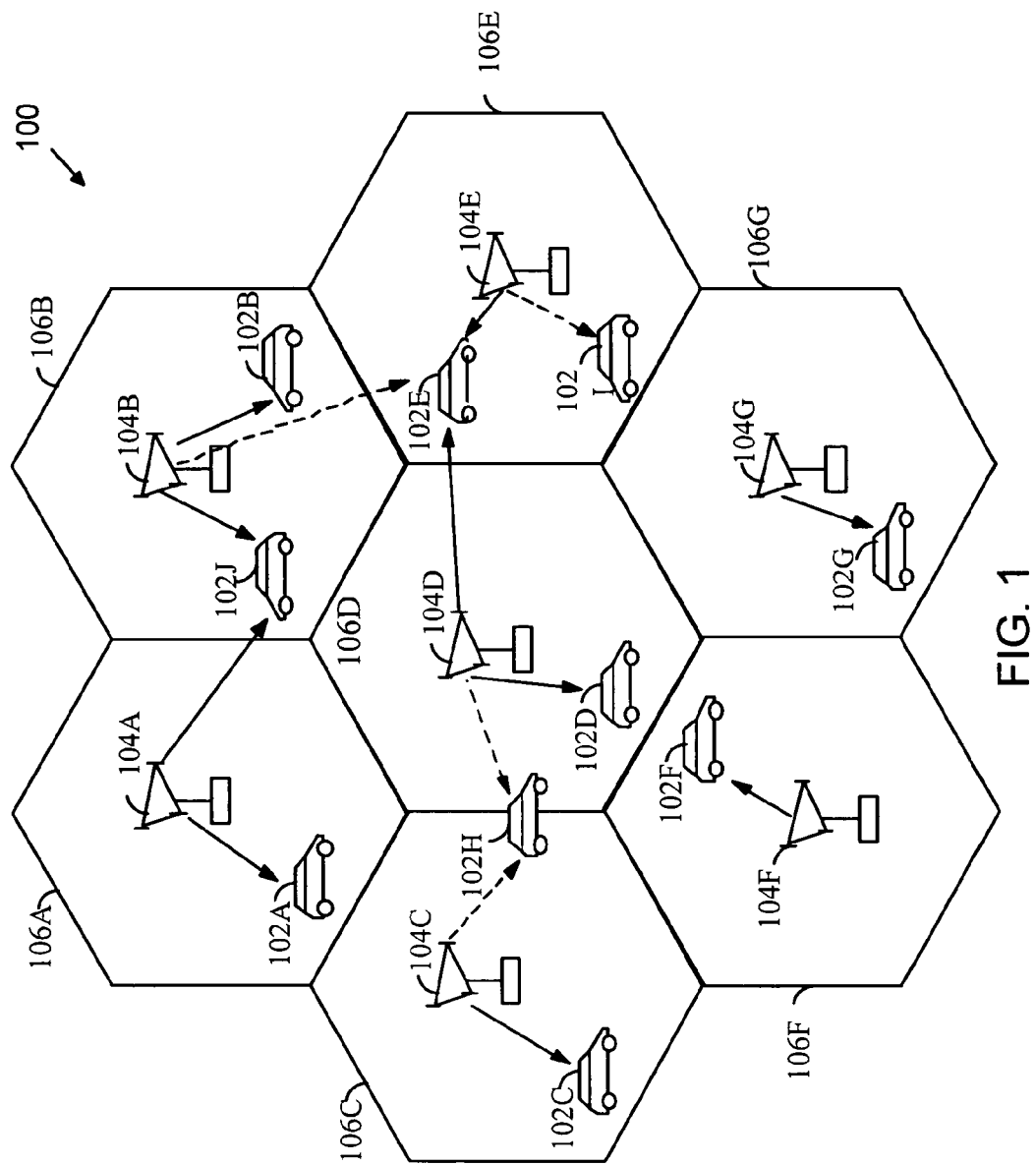
FIG. 1 is one embodiment of a wireless communication system.

FIG. 1 is one embodiment of a wireless communication system. Remote stations 102A-102I can be dispersed throughout the communication system 100 to be in communication with one or more base stations 104A-104G, with the multiple base stations 104A-104G in communication with a single base station controller (not shown). The communication system 100 can comprise multiple cells 106A-106G where each cell 106A-106G can be serviced by a corresponding base station 104A-104G. Each of the remote stations 102A-102I may communicate with one or more base stations 104A-104G on the forward link at each traffic channel frame. For example, the base station 104A can transmit to remote stations 102A and 102J, base station 104B can transmit to remote stations 102B and 102J, and base station 104C can transmit to remote stations 102C and 102H: Each base station 104A-104G can transmit data to one or more remote stations 102A-102I at any given moment. In addition, the data rate can be variable and may be dependent on the carrier-to-interference ratio (C/I) as measured by the receiving remote station 102 and the required energy-per-bit-to-noise ratio. The reverse link transmissions from remote stations 102A-102I to base stations 104A-104G are not shown for simplicity.

Figure 2:
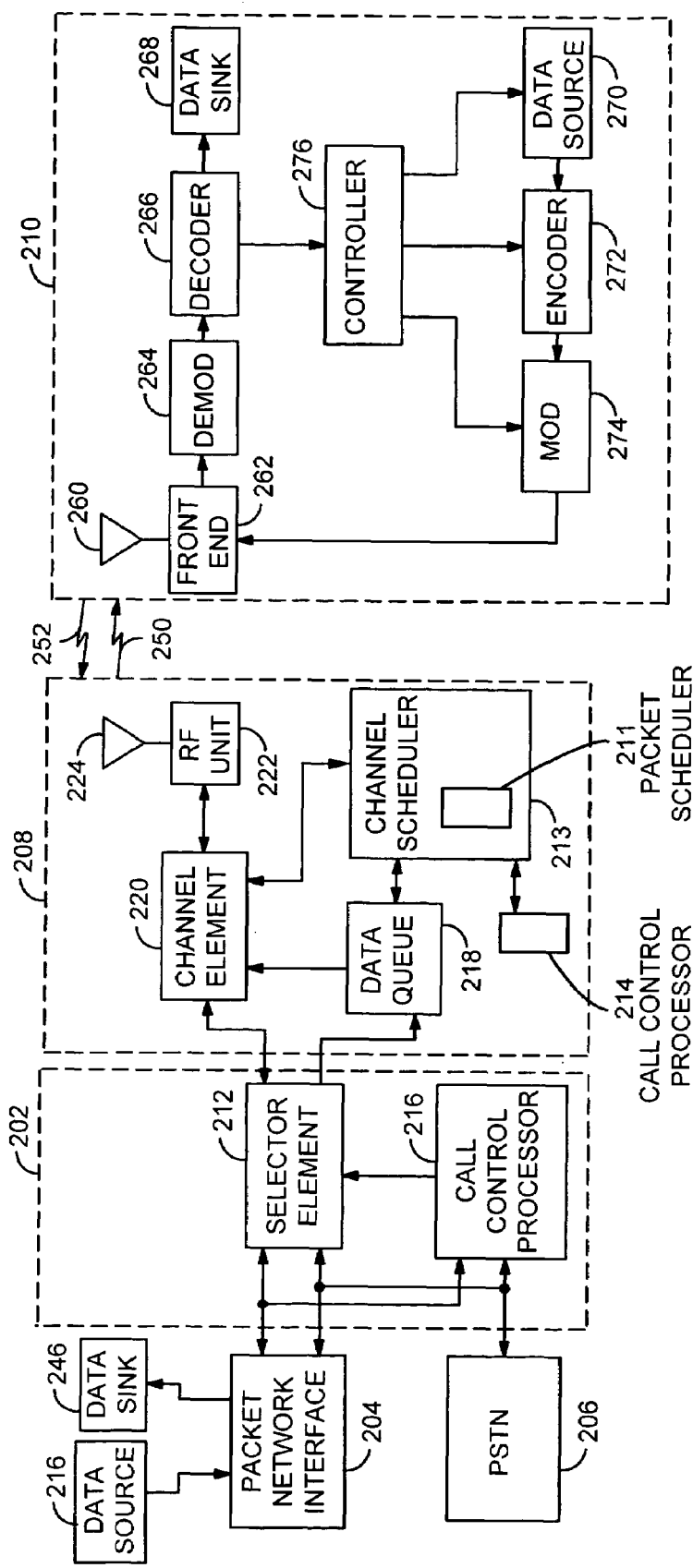
FIG. 2 is one embodiment of a block diagram illustrating the basic subsystems of a wireless communication system.

FIG. 2 is one embodiment of a block diagram illustrating the basic subsystems of a wireless communication system. A Base Station Controller (BSC) 202 can interface with a packet network interface 204, the Public Switched Telephone Network (PSTN) 206, and all base stations (BTS) 208 (only one shown) in the communication system 200. The base station controller 202 can coordinate communications between the remote stations 210 in the communication system 200 and other users connected to the packet network interface 204 and the PSTN 206.

Within the BTS 208, a call processor 214 can exist at the BSC to coordinate with each selector element 212 to control the communications between one or more base stations 208 and at least one remote station 210. If a selector element 212 has not been assigned to the remote station 210, the call control processor 214 can be informed of the need to page the remote station 210 where the call control processor 214 then can direct the base station 208 to the remote station 210.

A data source 216 can contain data which can be transmitted to the remote stations 210. The data source 216 can provide the data to the packet network interface 204 where the packet network interface 204 can receive the data and route the data to the selector element 212. The selector element 212 can send the data to each base station 208 in communication with the remote station 210. In one embodiment, each base station 208 can maintain a data queue 218 which can contain the data to be transmitted to the remote station 210.

In one embodiment for admission control, the admission control function can reside at a processor 214 that is positioned at the BTS 208. A packet scheduler 211 can reside at a DSP 213 also within the BTS 208 to interact with the channel elements 212. The data can then be sent, in data packets from the data queue 218, to the channel elements 220. On the forward link, a data packet can refer to a fixed amount of data to be transmitted to the destination remote station 210 within one frame. For each data packet, a channel element 220 can insert the necessary control fields. In one embodiment, the channel element CRC (Cyclic Redundancy Code) can encode the data packet and control fields and insert a set of code tail bits. The data packet, control fields, CRC parity bits, and code tail bits comprise a formatted packet. The channel element 220 can encode the formatted packet and then interleave (or reorder) the symbols within the encoded packet. The interleaved packet can be scrambled with a long PN code, covered with a Walsh cover and spread with the short PN. sub. I and PN sub. Q codes. The spread data can then be provided to a radio frequency (RF) unit 222 which quadrature modulates, filters, and amplifies the signal. The forward link signal can then be transmitted over the air through an antenna 224 on a forward link 226.

At the remote station 210, the forward link signal can be received by an antenna 228 and routed to a receiver (not shown) within the front end 230. The receiver filters, amplifies, quadrature demodulates, and quantizes the signal. The digitized signal can then be provided to a demodulator (DEMOD) 232 where the signal can be despread with the short PN.sub.I and PN.sub.Q codes, decovered with the Walsh cover, and descrambled with the long PN code. The demodulated data can then be provided to a decoder 234 which can perform the inverse of the signal processing functions done at the base station 208, specifically the de-interleaving, decoding, and CRC check functions. The decoded data can then be provided to a data sink 236.

The communication system 200 supports data and message transmissions on a reverse link 238. Data to be sent can reside in a data source 239. Within the remote station 210, a controller 240 can process the data or message transmissions by routing the data or message to an encoder 242. In one embodiment, the encoder 242 can format the message consistent with a blank-and-burst signaling data format. The encoder 242 can then generate and append a set of CRC bits, append a set of code tail bits, encode the data and appended bits, and reorder the symbols within the encoded data. The interleaved data can then be provided to a modulator (MOD) 244.

The modulator 244 can be implemented in many embodiments. In a first embodiment, the interleaved data can be covered with a Walsh code which identifies the data channel assigned to the remote station 210, spread with the long PN code, and further spread with the short PN codes. The spread data can then be provided to a transmitter (not shown) within the front end 230. The transmitter can modulate, filter, amplify, and transmit the reverse link signal over the air, through the antenna 228, on the reverse link 238.

At the base station 208, the reverse link signal can be received by the antenna 224 and provided to the RF unit 222. The RF unit 222 can filter, amplify, demodulate, and quantize the signal and provide the digitized signal to the channel element 220. The channel element 220 can despread the digitized signal with the short PN codes and the long PN code. The channel element 220 can also perform the Walsh code mapping or decovering, depending on the signal processing performed at the remote station 210. The channel element 220 can then reorder the demodulated data, decode the de-interleaved data, and perform the CRC check function. The decoded data, e.g. the data or message, can be provided to the selector element 212. The selector element 212 can then route the data and message to the appropriate destination (e.g., data sink 246).

The hardware, as described above, supports transmissions of data, messaging voice, video, and other communications over the forward link, such as, for example, over a CDMA system. Other hardware architecture can be designed to support variable rate transmissions and are within the scope of the present invention.

In one embodiment for admission control, the service requirements from the various individual communications, i.e. communication flows, can represent different levels of Quality of Service (QoS) which can be converted into resource requirements on the forward link. A QoS scheduler, i.e. the packet scheduler 214 (FIG. 2), can provide flows assigned a first priority, such as, for example, EF flows, with absolute priority over a second priority, such as, for example, AF flows. This can be accomplished by having the packet scheduler 214 attempt to transmit EF packets as soon as they arrive at the queues. Therefore, as long as the delay boundary of the EF flow is not too short, focus can be maintained on the rate requirement in the admission control of EF flows without explicitly considering the delay requirement. To assure a reasonable time margin for the packet scheduler 214, it can be stipulated that the delay boundary (time between received at base station and received at the remote) of any EF flow is no smaller than, for example, 100 ms, since currently, 100 ms is used for regular voice-over-IP (Internet Protocol) flows. Therefore, where admission control is concerned, the QoS requirements from both EF and AF can be rate based.

One resource considered on the forward link can be the time slots. Therefore the admission control decision can be primarily based on the fraction of time slots used by the QoS flows and the QoS violations. The sum of time utilization of all EF flows and that of all QoS flows can be used to decide if a new flow can be admitted. The packet scheduler can allocate slots to a user depending on the data rate information specified by the Data Rate Control (DRC) channel on the reverse link. The data rate for a flow can be selected to reflect the channel conditions as seen by the remote station. The fraction of action time for each flow can depend on both a required rate and an average DRC of each corresponding user. Information on the time utilization of existing flows can be collected directly in real time and an average DRC for all existing users can be computed.

For a new flow where no service record is accumulated, the new flow requirement on the time utilization can be estimated based on the new flow QoS required rate and its average DRC where the average DRC can be based, for example, on sampling. If a new flow is from an existing user, the average DRC can be known since the admission control algorithm monitors the channel quality of existing QoS flows. However; if a new flow is from a new user with no DRC record, the average DRC can be estimated, such as, for example, by a moving average of its requested DRC during the connection setup, or a smoothed average obtained through an IIR filter. The design parameter involved in this estimation is the window length in the case of moving average and the time constant in the case of IIR filtering.

Wireless channel quality can be time varying and as a result, long term behavior of channel quality is difficult to predict. Consequently, it is possible that a particular QoS flow is admitted when the channel quality is good enough for its QoS requirement to be satisfied and then the user can go into deep fading later for extended periods of time. When this happens, its QoS requirement will be violated in spite of the prioritized service from the scheduler. The result could be a large time utilization and severe QoS violations, e.g., high packet loss for EF and low throughput for AF. Due to this high loss, the EF flow requirements may not be met. As a result, access control can terminate such EF flows to relieve the pressure to all other QoS flows in the sector. A similar argument applies to AF flows in deep fading where these AF flows can be degraded to BE instead of being terminated. Therefore, in one embodiment, the following adjustment policy or "booting feature" by admission control can be implemented:

An EF flow may be terminated if its packet loss rate is high for a long period of time, an AF flow can be degraded to BE if, over a long time, its throughput is too low compared with its required rate, and even if there is no single EF or AF flow suffering from a long and severe QoS violation but there are QoS violations among QoS flows, an algorithm may look for any QoS flow with too high utilization and adjust its status. This feature is included to alleviate the case where the QoS violations are distributed among multiple flows instead of being concentrated in one flow. This booting feature may affect the flows belonging to users with a low DRC.

In one embodiment for admissions control, the following statistics can be collected:

The fraction of time that each flow is served by the BTS,
The packet drop percentage for EF flows,
The throughput for AF flows, and
The average requested DRC by each user.

Flow Time Fraction

At the BTS, an algorithm can maintain a time slot counter for each flow. The counter can increment by one after each slot in which the flow is served. Based on the counter value, the fraction of time each flow is served can be periodically computed such as with a period, such as, for example, a period of approximately 300 slots.

EF Flow Drop Percentage

Two counters for each EF flow can be used:
One counter can record the number of dropped packets due to delay violations,
Another counter can count the total number of packets received, with the drop percentage computed every period, such as, for example approximately every 300 slots.

AF Flow Throughput

A counter can be maintained for each AF flow, which can record the number of transmitted MAC packets and where the throughput can be computed every period, such as, for example, approximately every 300 slots. There can be an IIR estimation of throughput that can be used by the scheduler. Here a linear estimator can be used mainly to reduce the impact of the burstyness in the scheduling.

Average User DRC Request

This requirement can be computed by maintaining two counters:
One for the payload size in MAC packets, and
one for the number of transmission time slots without early termination.

Both counters can increment at each slot and where the average DRC can be computed periodically, such as, for example, approximately every 300 slots. There can be a shorter period for this computation for an incoming user. This information can be used to make the admission decision for a new QoS flow of a new user where throughput can be computed every period, such as, for example, approximately every 100 slots.

The above average DRC estimation can have a negative bias, especially for slow fading users, however, such a bias may not be harmful because the slow fading channel can be the worst channel in terms of QoS violations.

Statistics Processing

All the processing listed below may be executed only at the end of each period as specified.

The statistics collected can be smoothed by Infinite Imposed Response (IIR) filters as follows.

The fraction of time each flow is served:
Let $TF_k(n)$ be the time fraction of flow k at time period n. The average time fraction at time n, avg $TF_k(n)$, is updated by an IIR filter $$avgTF_k(n)=(1-\alpha_{TF})avgTF_k(n-1)+\alpha_{TF}TF_k(n),$$

where, as an example, $\alpha_{TF}=0.5$ by default.
Drop percentage for EF flows:
Drop percentage for each EF flow k, $DROP_k(n)$, is computed during each period. Its average, avg $DROP_k(n)$, is also obtained through IIR filtering:

$$avgDROP_k(n)=(1-\alpha_{DROP})avgDROP_k(n-1)+\alpha_{DROP}DROP_k(n),$$

where, as an example, $\alpha_{DROP}=0.5$ by default.
Throughput for AF flows:
Throughput for each AF flow k, $Th_k(n)$, is computed during each period. Its average, avg $Th_k(n)$, is also obtained through IIR filtering:

$$avgTh_k(n)=(1-\alpha_{Th})avgTh_k(n-1)+\alpha_{Th}Th_k(n),$$

where, as an example, $\alpha_{Th}=0.5$ by default.
Average DRC request for a flow:
An average DRC for flow k, $DRC_k(n)$, can be estimated by the ratio of total requested payload and total requested time slots. Its smoothed version, avg $DRC_k(n)$, can also be obtained through IIR filtering:

$$avgDRC_k(n)=(1-\alpha_{DRC})avgDRC_k(n-1)+\alpha_{DRC}DRC_k(n),$$

where, as an example, $\alpha_{DRC}=0.5$ by default.
This average DRC can be collected for all the existing users. If a new flow comes in from a new user, requested DRC information can be collected during the connection setup time, and a shorter updating period, such as, for example, 100 slots, could be used. The parameters in each statistic processing, including $\alpha_{TF}$, $\alpha_{Th}$, $\alpha_{DROP}$, $\alpha_{DRC}$ can be configured independently Decision Processes The admission control algorithms can give priorities to handoff flows and re-established flows waking up from dormancy. The admission control algorithms can accept EF and/or AF flows regardless of the sector utilization. Accordingly, there can be some margin in time slots for these two types (EF/AF) of flows.

Figure 3:
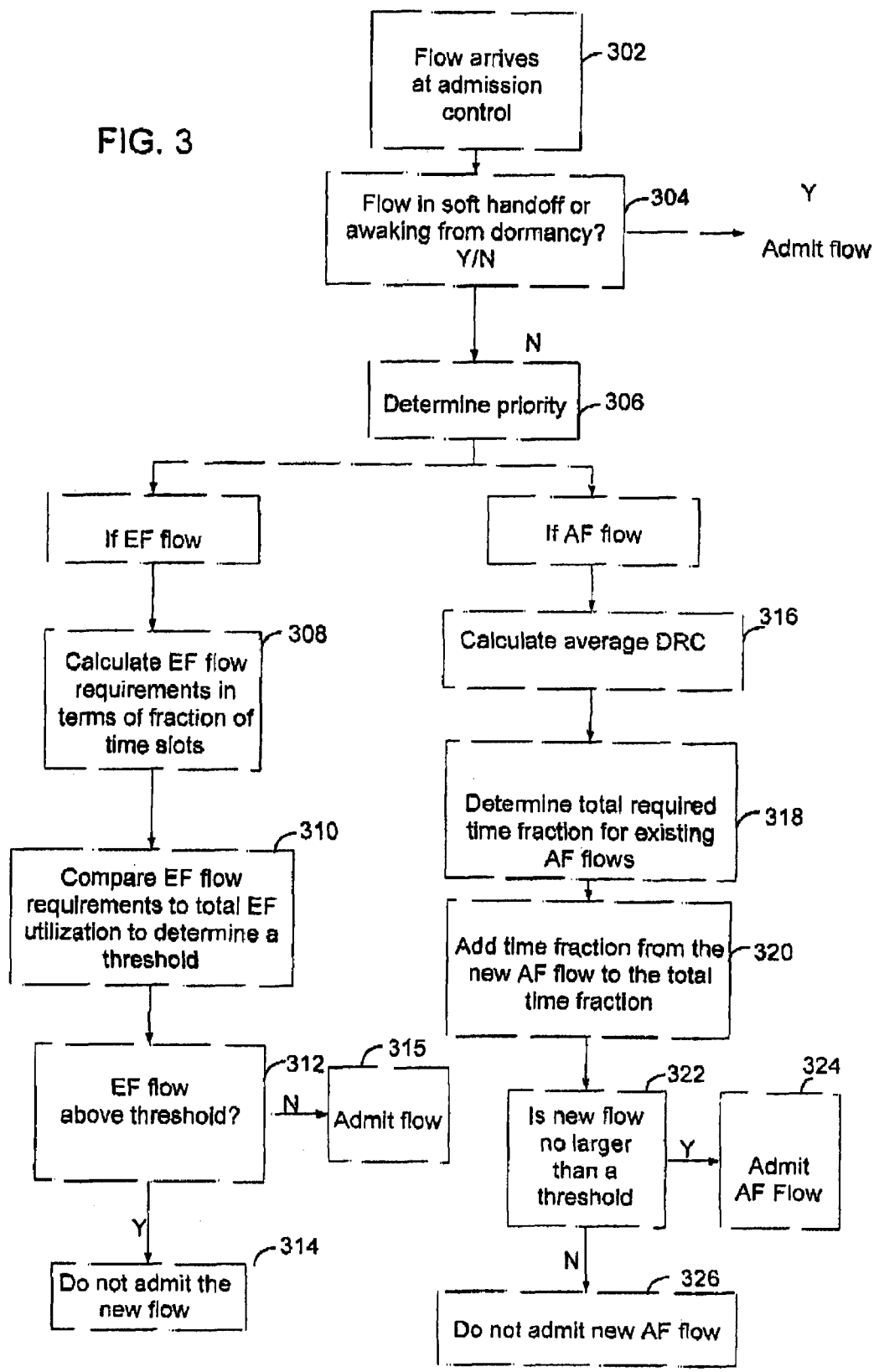
FIG. 3 is a flow chart of one embodiment of a method for admission control.

FIG. 3 is a flow chart of one embodiment of a method for admission control. A flow can arrive at a base station requesting admission (operation 302). Admission control can give a highest priority to admitting a flow coming in to connect to a BTS that is either a flow in handoff or a flow waking up from dormancy. Such conditions of a flow can provide for automatic admission or to give a high priority for admission (operation 304). For a new flow that is not in handoff or waking from dormancy, admission control can then determine the QoS, i.e. the priority of the new flow (operation 306). When a new EF flow comes in, its average requested DRC can be collected and used to calculate the requirements of the new EF flow in terms of fraction of time slots (operation 308). The admission control can then add this requirement to the total EF utilization (operation 310). The new EF flow can be admitted only if the total required time fraction is less than a threshold. In one embodiment, the recommended threshold can be approximately 30% (operation 312). If above the threshold, the flow may not be admitted (operation 314), if below, the EF flow can be admitted (operation 315). It can be appreciated that the total EF traffic can be a mix of different classes, such as, for example, voice-over-IP or video conferencing.

The threshold on total EF utilization is generally applicable. A design criterion can be that the average drop percentage of all the admitted EF flows is less than 1%. A slow fading, such as, for example, the "Pedestrian A" model with one antenna (at 3 km/hr), is the worst channel model in terms of packet drop. In one embodiment, the above threshold value can be determined by simulating the scenario where all the EF flows have this type of channel.

When a new AF flow comes in, its average DRC can be computed in a similar way as for a new EF flow (operation 316). The total required time fraction for existing AF flows can be the sum the served time fraction of each AF flow, scaled by the ratio of its required rate and actual throughput (operation 318). The required time fraction from the new AF flow can then be added to this sum (operation 320). The new AF flow can be admitted only if the total QoS utilization (EF utilization+AF utilization) is no larger than a threshold, where, as one example, the recommended threshold value can be approximately 50% (operation 322). If the new AF flow is below the threshold it can be admitted (operation 324) and if above the threshold, the new AF flow may not be admitted (operation 326).

Figure 4:
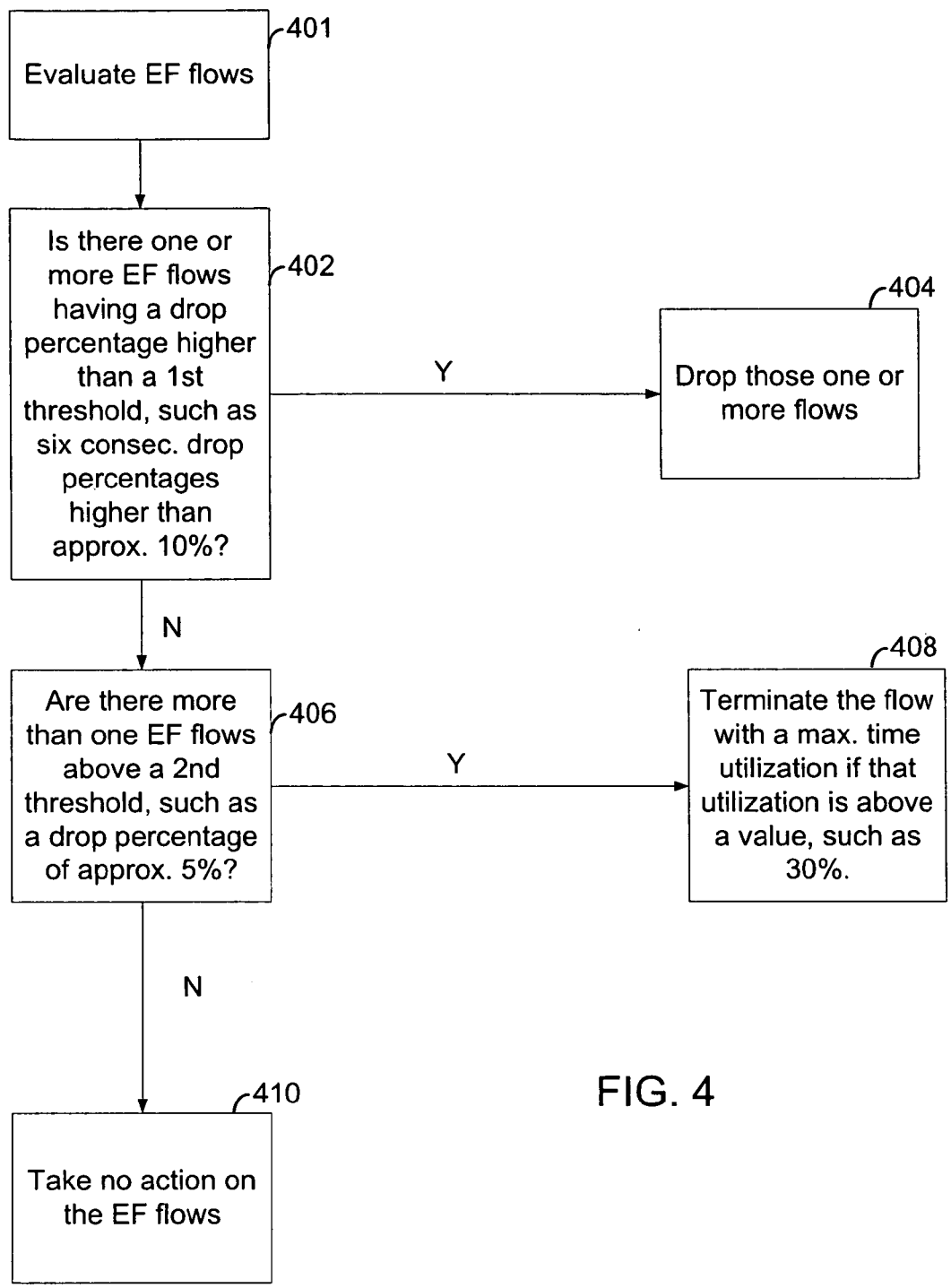
FIG. 4 is a flow chart of one embodiment of a method for terminating an existing EF flow.

For existing QoS flows, their QoS status should be adjusted in case their QoS violation is severe despite the prioritized service. FIG. 4 is a flow chart of one embodiment of a method for terminating existing EF flows.

A threshold covering the total EF utilization may applicable. A design guideline can be that the average drop percentage of all the admitted EF flows is less than 1%. An approach can then be to drop one or more EF flows if certain criteria are not met. In one embodiment, the EF flows are evaluated for their drop percentage (operation 401) and when an EF flow has a smoothed drop rate, i.e. a drop percentage, higher than a threshold, such as, for example approximately 10% for approximately three seconds in a row (operation 402), that EF flow may be terminated (404). The smoothed drop rate can be updated, such as, for example, approximately every 300 slots. These criteria may be the same as six consecutive drop rates higher than 10%. If there is not a single EF flow satisfying this condition, but there exists one or more EF flows with a drop rate higher than a threshold, such as, for example, approximately 5% (operation 406), algorithms can search among all EF flows and terminate the one with maximum time utilization if that utilization is higher than another value, such as, for example, approximately 30% (operation 408) and if no EF flow is higher than this value, then no action may be taken on the EF flows (operation 410)

Figure 5:
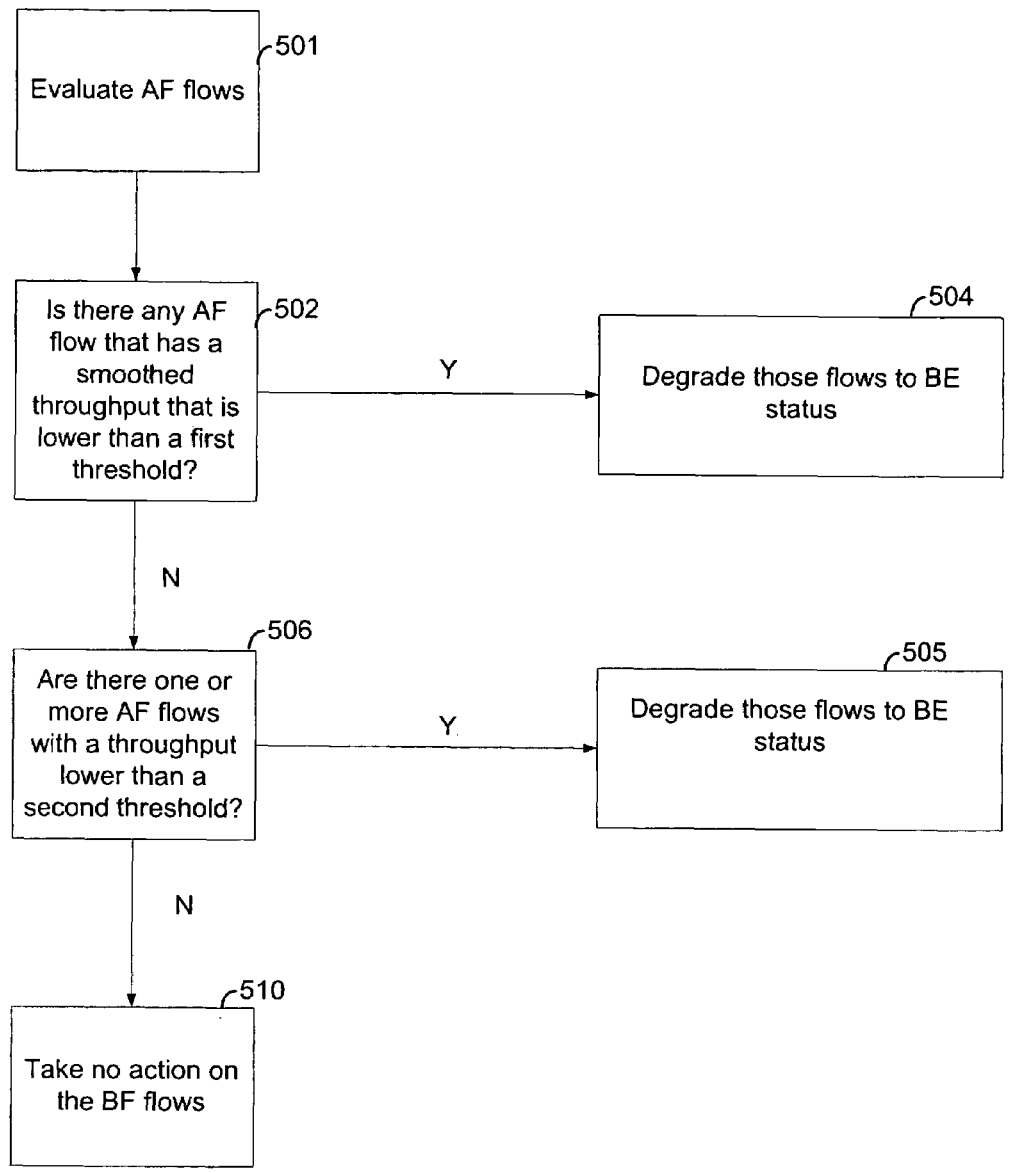
FIG. 5 is a flow chart of one embodiment for degrading an existing AF flow to BE status.

FIG. 5 is a flow chart of one embodiment of a method for degrading an existing AF flow to BE status. Depending on a variety factors, the range for any criterion used for degrading an AF flow to a BE flow may be large. Admission control evaluates the AF flows for throughput (operation 501) and determines any AF flow that has a smoothed throughput that is based on a linear estimation per some number of slots (such as, for example, approximately 300 slots) that is lower than a first threshold, such as, for example, approximately 50% of the required rate for longer than a period of time. Such a period of time may be, such as, for example, approximately three seconds (operation 502). This criteria may be considered the same as for a throughout lower than approximately 50% of the required rate for six consecutive samples. Admission control may degrade those flows that meet this first threshold to BE (operation 504). If there is not an AF flow satisfying this condition, admission control can determine if there exists one or more AF flows whose throughput is lower than a second threshold, such as, for example, approximately 50% of the required rate and the maximum time utilization of these AF flows is higher than approximately 50% (operation 506). If one or more AF flows are found meeting this second threshold, those AF flows may be degraded to BE (operation 508) and if not then admission control may take no action (operation 510).

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. An apparatus for a wireless communication system, comprising:
   means for determining available resources in the wireless communication system;
   means for determining a threshold based on a time slot utilization by flows and priority violations in real time for existing flows;
   means for admitting a new flow only if the total time slot utilization is below the threshold; and
   means for admitting a new AF flow based on the sum of an actual time fraction of each AF flow, scaled by a ratio of a required minimum rate and a measured throughput of the new AF flow.

2. The apparatus of claim 1, further comprising means for scheduling an adjustment of an existing flow.

3. The apparatus of claim 2, further comprising means for adjusting a flow is determining too high a utilization based on priority violations among the flows.

4. The apparatus of claim 2, further comprising means for scheduling an adjustment is determining to terminate an EF flow.

5. The apparatus of claim 2, further comprising means for scheduling an adjustment is determining to degrade an AF flow to a BE flow.

6. A method for information transfer, comprising:
   determining a threshold based on a time slot utilization by flows and priority violations in real time for existing flows;
   monitoring the time slot utilization;
   monitoring the priority violations;
   admitting a new flow only if the total time slot utilization is below the threshold and
   determining a new AF flow threshold for admitting a new AF flow based on the sum of an actual time fraction of each AF flow, scaled by a ratio of a required minimum rate and a measured throughput of the new AF flow.

7. The method of information transfer of claim 6, wherein the total time slot utilization is below the threshold of about 30%.

8. The method of information transfer of claim 6, wherein the required time fraction from the new AF flow is added to the sum.

9. The method of information transfer of claim 6, wherein the new AF flow is admitted if the total EF plus AF utilization is no larger than a Qos threshold.

10. The method of information transfer of claim 9, wherein the Qos threshold is approximately less than about 50%.

11. The method of information transfer of claim 6, further comprising computing the average DRC for a new AF user from a moving average of the requested DRC during a connection setup.

12. The method of information transfer of claim 6, further comprising terminating an EF flow if its packet loss rate exceeds a value for a period of time.

13. The method of information transfer of claim 12, wherein the value is a smoothed drop rate higher than approximately 10%.

14. The method of information transfer of claim 12, wherein the period of time is approximately three consecutive seconds.

15. The method of information transfer of claim 6, further comprising degrading an AF flow to a BE flow if, over a period of time, the AF flow throughput is low compared with a minimum required rate for AF.

16. The method of information transfer of claim 15, wherein the low throughput is a smoothed throughput based on the linear estimation per a number of slots that is lower a percentage of the require rate for longer than a period of time.

17. The method of information transfer of claim 16, wherein the number of slots is approximately 300.

18. The method of information transfer of claim 16, wherein the period of time is approximately 3 consecutive seconds.

19. The method of information transfer of claim 6, further comprising adjusting a flow with too high a utilization if there are priority violations among flows.

20. A computer-readable storage medium containing a set of instructions for a processor having an interface with other elements of an information transfer system, the set of instructions comprising:
   determining a threshold based on a time slot utilization by flows and priority violations in real time for existing flows;
   monitoring the time slot utilization;
   monitoring the priority violations;
   admitting a new flow only if the total time slot utilization is below the threshold;
   determining a required time fraction for existing AF flows by adding an actual time fraction of each AF flow, scaled by a ratio of a required minimum rate and a measured throughput of the new AF flow; and
   admitting a new AF flow when the sum of a required time fraction of the new AF flow with the required time fraction for existing AF flows is less than a QoS threshold.

21. An apparatus for a wireless communication system, comprising:
   a computer readable memory device for containing a priority;
   means for determining available resources in the wireless communication system;
   means for determining a threshold based on a time slot utilization by flows and priority violations in real time for existing flows;
   means for determining an admission of a new flow only if the total time slot utilization is below the threshold; and
   means for determining a new AF flow threshold for admitting a new AF flow based on the sum of an actual time fraction of each AF flow, scaled by a ratio of a required minimum rate and a measured throughput of the new AF flow.

* * * * *

UNITED STATES PATENT AND TRADEMARK OFFICE
CERTIFICATE OF CORRECTION

PATENT NO. : 7,385,920 B2  
APPLICATION NO. : 10/749534  
DATED : June 10, 2008  
INVENTOR(S) : Danlu Zhang and Rajesh K. Pankaj It is certified that error appears in the above-identified patent and that said Letters Patent is hereby corrected as shown below:

In column 11, claim 16, lines 7- 8, "lower a percentage", should read, --lower than a percentage--

In column 11, claim 16, line 8, "the require rate", should read, --the required rate--

Signed and Sealed this

Thirtieth Day of June, 2009

JOHN DOLL  
*Acting Director of the United States Patent and Trademark Office*